United States Patent [19]

Blanc et al.

[11] Patent Number: 4,933,672

[45] Date of Patent: Jun. 12, 1990

[54] DATA TRANSMISSION SYSTEM WITH A DIGITAL ALARM FACILITY

[75] Inventors: Alain R. Blanc, Vence; Patrick J. Jeanniot, LaGaude; Robert L. Leotard, Vence, all of France

[73] Assignee: International Business Machines Corporation, Armonk, N.Y.

[21] Appl. No.: 234,981

[22] Filed: Aug. 22, 1988

[30] Foreign Application Priority Data

Oct. 9, 1987 [EP] European Pat. Off. ............ 87480010

[51] Int. Cl.$^5$ .................... H04B 17/00; H04Q 1/36
[52] U.S. Cl. ........................ 340/825.36; 340/825.2; 371/55; 375/116
[58] Field of Search ............... 340/825.36, 825.2; 370/100, 102, 84, 100.1; 375/116, 26; 371/47.1, 49.1, 49.2, 55

[56] References Cited

U.S. PATENT DOCUMENTS

| | | | |
|---|---|---|---|
| 4,161,719 | 7/1979 | Parikh et al. | 375/116 |
| 4,531,212 | 7/1985 | Hadziomerovi | 370/102 |
| 4,689,790 | 8/1987 | Lacroix et al. | 370/84 |
| 4,745,601 | 5/1988 | Diaz et al. | 370/84 |

FOREIGN PATENT DOCUMENTS 0015730 9/1980 European Pat. Off. .
0050434 5/1981 European Pat. Off. .
2101852 1/1983 United Kingdom .

OTHER PUBLICATIONS

Patent Abstracts of Japan, vol. 1, Jul. 22, 1977, No. 145, p. 1216.

*Primary Examiner*—Donald J. Yusko
*Assistant Examiner*—Dervis Magistre
*Attorney, Agent, or Firm*—Edward H. Duffield

[57] ABSTRACT

The data transmission system includes a data transmitter for transmitting either data bits or a sequence of N alarm bits in a first binary state. The transmitter includes a decode circuit (16) providing a detection signal each time that, in a data bit stream, a sequence of n bits in the first binary state has been loaded in a shift register (14), a XOR circuit (18) modifying the binary state of the bit following the sequence of n bits in response to the detection signal provided by the decode circuit (16), thereby providing a modified data bit stream on the transmit line (20), the number n being chosen so that no modified data bit stream can be formed of N bits in the first binary state which could be confused with the sequence of N alarm bits. On the reception side, the data receiver performs the reciprocal operation of the data transmitter.

9 Claims, 2 Drawing Sheets

DATA TRANSMISSION SYSTEM WITH A DIGITAL ALARM FACILITY

FIELD OF THE INVENTION

The present invention relates generally to the data transmission systems and in particular to a data transmission system having data circuit-terminating equipments provided with a digital alarm facility.

BACKGROUND OF THE INVENTION - PRIOR ART

With the increasing complexity of distributed data processing systems, particularly those utilizing telephone data communication between central and remote Data Terminal Equipments (DTE) and their associated Data Circuit Terminating Equipments (DCE), the need for testing and control of these DCE's has increased. DCE malfunctions become increasingly critical in that one malfunctioning DCE may interrupt transmission by many others in the network. The need has arisen to automatically control DCE's in a distributed system to minimize time losses Therefore, it has become highly desirable to provide the DCE with the capability to send alarm signals in case of failure, to make the difference between a failing link, and a failing remote DCE.

In analog data communication networks the Data Circuit Terminating Equipment is a so called modem which modulates the digital data transmitted by the Data Terminal Equipment, and demodulates the data received from the communication network for the associated DTE. Each remote modem is generally provided with an alarm device, able to send an alarm tone to the control station when the modem is out of order because of a power supply failure or of an internal hardware failure. Such an alarm tone is, in an analog network, a special signal different from the line modulation.

The trend is now to install digital communication networks instead of analog communication networks. A network of this type is the Dataphone Digital Service (DDS), already in use in the United States. In such a digital network, the Data Circuit Terminating Equipment (DCE) is called a Data Service Unit (DSU).

In a digital communication network, the alarm is given by sending a bit configuration which has two characteristics it must be recognized as alarm signals and it must have the priority over any other data bit configuration being transmitted at the same time. On the DDS network, the bit configuration which fulfills the latter conditions is a long sequence of 0 bits. This is based upon the fact that the network behaves as an AND circuit when it is receiving, on a common line, several messages from different remote stations in a multipoint configuration. It must be noted that such a bit configuration would be a sequence of 1 bits if the network would behave as an OR circuit rather than an AND circuit.

Assuming that a certain bit configuration (such as a sequence of 0bits or of 1 bits) be transmitted as a digital alarm signal by the Data Service Unit in distress, the problem is to avoid the initiation of this signal during normal DTE to DTE communications over the network.

OBJECTS OF THE INVENTION

The object of the invention is, therefore, to provide an improved a data transmission system with a digital alarm facility, including a device for transcoding data bits before transmitting them over the communication network, so that these data bits cannot be confused with the digital alarm signal which is transmitted when the system goes power off or when an internal failure occurs, such a transcoding device being able to operate whichever data link protocol is used by the system.

Another object of the invention is to provide an improved data transmission system including a device for decoding bits received over the network and recovering the data bits transmitted by a remote system using any data link protocol, when these bits have been transcoded by the remote system because they would have been confused with the digital alarm signal in case the remote system goes power off or an internal failure occurs.

BRIEF SUMMARY OF THE INVENTION

Therefore, in accordance with the present invention, a data transmission system comprises a data transmitter transmitting information signals over a data net work to a data receiver, the information signals being either data bits when the transmitter is in data mode, or a sequence of N alarm bits in a first binary state when the transmitter is in alarm mode. The transmitter comprises a detection device providing a detection signal each time that, in a source data bit stream transmitted by the transmitter in data mode, a sequence of n bits in the first binary state has been detected, and a bit modifying means for modifying the binary state of at least one bit following the sequence of n bits in response to the detection signal, thereby providing a modified data stream, the number n being chosen so that no modified data bit stream can be formed of N bits in the first binary state which could be confused with the sequence of N alarm bits.

In accordance with another aspect of the invention, a data transmission system comprises a data receiver receiving information signals over a data network from a data transmitter, the information signals being either data bits when the transmitter is in data mode, or a sequence of N alarm bits in a first binary state when the transmitter is in alarm mode. The receiver comprises a detection device providing a detection signal each time that, in a data bit stream received by the transmitter, a sequence of n bits in the first binary state has been detected, and a bit modifying means for modifying the binary state of at least one bit following the sequence of n bits in response to the detection signal, thereby providing a modified data stream, the number n being chosen so that no modified data bit stream can be formed of N bits in the first binary state.

For a more complete understanding of the present invention, reference is now made to the following detailed description taken in conjunction with the accompanying drawings in which:

DETAILED DESCRIPTION OF PREFERRED EMBODIMENT

Figure 1:
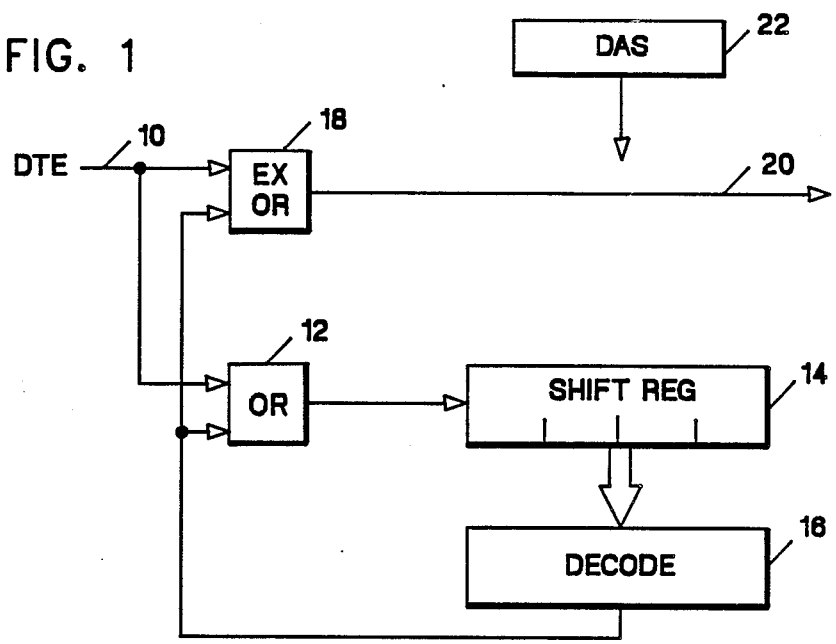
FIG. 1 is a block diagram of a device according to the invention on the transmission side of a data transmission system using the BSC protocol.

The present invention is described hereafter in the environment of a digital communication network of the type known as Dataphone Digital Service (DDS). The data are transmitted over the network by means of Data Service Units (DSU).

Assuming that several tributary DSU's are linked to a control DSU in a multipoint configuration, the polling procedure guarantees that only one DSU is talking at a time. When a tributary DSU is in distress, it violates the polling procedure and it sends a digital alarm signal (DAS) whether it has been polled or not, and whether it has already started to send data or not. This is based on the assumption that the data from the DSU being polled can be lost whereas the DAS signal from any other DSU must be recovered. As the DDS network behaves like an AND circuit, the only signal that can be guaranteed to arrive to the control DSU is a sequence of 0 bits. Therefore, each tributary DSU is provided with a device which sends a DAS in the form of a long sequence of 0 bits as soon as a power supply failure or an internal failure occurs.

The problem is that the DAS composed of 0 bits must not be confused with data. In other words, one should avoid transmission of data composed of a sequence of 0 bits equal to or longer than the DAS sequence. The solution consists in inverting each bit following a sequence of n 0 bits at transmission, and doing the reciprocal operation at reception.

But, there is the possibility that the data stream could be composed of a sequence of n 0 bits followed by a 1 bit. In this case the inversion of the n+1 th bit results in a sequence of 0 bits which can be confused with the DAS.

The essential feature of the invention in overcoming the above problem, is that particular sequences of bits are impossible according to the protocol used by the system. Accordingly, n is chosen so that the sequence of bits which would result in a sequence of 0 bits confusable with the DAS, is one of these particular sequences.

Assuming that the system is working according to the BSC protocol which is a protocol widely used in the transmission systems, n can be chosen equal to 4. This means that one cannot have a data bit stream composed of the repetition of the sequence ... 00001... long enough to be confused, when modified, with the DAS. In fact, it can be easily seen from the following Table that such a data bit stream includes a particular sequence formed of the bytes 21, 84, 10, 42, for each possible byte synchronization if a sufficient number 00001 is considered. Note that, on the line, the low order bit of each byte is transmitted first, and therefore, each byte 21, 84, 10, 42 has to be read from the right to the left.

```
   1st                                                           Last
   00001000010000100001000010000100001000 .......... 0000100001
1   < 21 >< 84 >< 10 >< 42 > ...........................
2 ....... < 21 >< 84 >< 10 >< 42 > .....................
3 ............. < 21 >< 84 >< 10 >< 42 > ...............
4 ................ < 21 > ..............................
5 .................... < 21 > ..........................
6 ........................ < 21 > ......................
7 ............................ < 21 > ..................
8 ................................ < 21 > ....... < 42/C2 >
```

From this table, it appears that a data stream formed of 14 sequences 00001, would include the impossible particular sequence, in one of lines 1 to 8, except in line 8 where the sequence can be 21, 84, 10, 42 or 21, 84, 10, C2 which is also an impossible sequence in BSC depending on the bit which immediately follows the 70 bit stream.

The invention can be implemented according to the block diagram shown on FIG. 1. The data stream is received on line 10, and is loaded in shift register 14, via OR circuit 12. As soon as four 0 bits are loaded in shift register 14, decode circuit 16 produces a bit 1 which is used as input to OR circuit 12 and to XOR circuit 18. A bit 1 is then loaded after the sequence of four 0 bits in shift register 14, which prevents an eventual 5th bit 0 from being taken into consideration by decode circuit 16. The 1 bit, input to XOR circuit 18 is used to invert the data bit which immediately follows the 4 bits 0 received on line 10. Therefore, each sequence of four 0 bits is always followed by an inverted 5th bit when transmitted on Transmit line 20. Note that, in case of power supply failure or internal hardware failure, an alarm signal from DAS device 22, composed of a sequence of N "zero" bits, is forced to be transmitted on line 20. As mentioned above, a sequence of 70 bits formed of sequence 0001 is sufficient to include the impossible configuration 21, 84, 10, 42.

Accordingly, a sequence of N=80 0 bits is suitable for being recognized as the DAS signal.

Though the example given above is directed to the protocol BSC, it is clear that the principle of the invention can be applied with others protocols. With an. other protocol, the number n could be different (such as 3 or 5), and likewise for the number N which could be greater. The only condition is that n must be chosen so that no modified bit stream, wherein the bit following each repeated sequence of n 0 bits has been inverted, can be formed of as many 0 bits as in the DAS signal, because the corresponding source bit stream is impossible according to the link protocol which is used in the data transmission.

Another link protocol which is widely used in the data transmission is the HDLC protocol or SDLC in the IBM systems. In this case, not only it is possible to get a long sequence of 0 bits, but it is also possible to get a long sequence of repeated 00001 inside a stream. Therefore, the device described in FIG. 1 is useless for HDLC protocol.

Figure 2:
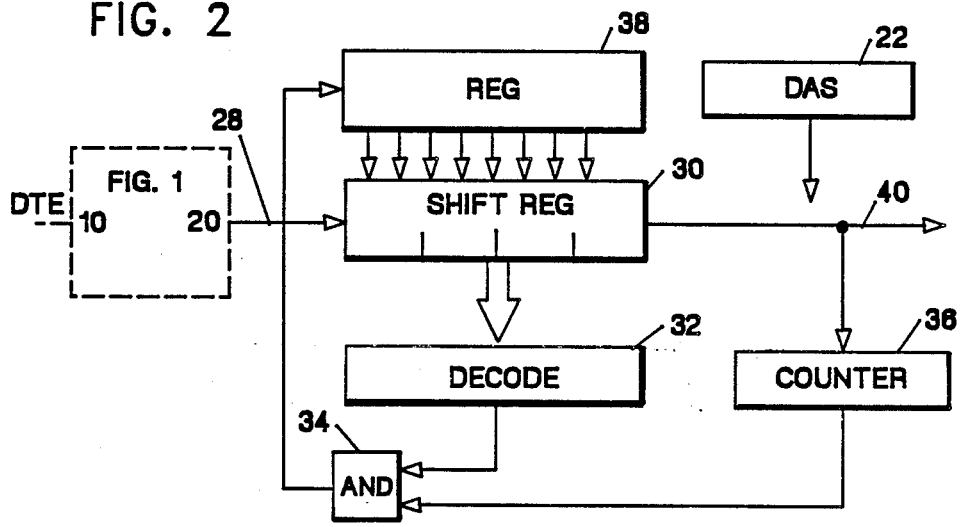
FIG. 2 is a block diagram of a device according to the invention on the transmission side of a data transmission system using the SDLC protocol.

A solution to solve the HDLC case, and which is also an important feature of the invention, is described in FIG. 2. It must be noted that the device of FIG. 2 can be used alone, or used in combination with the device of FIG. 1 as explained below.

It is known that particular sequences of bits are impossible with the protocol HDLC such as the 15 bits 010111111111010. Therefore, the data bits from line 28 are first loaded in shift register 30 composed of 15 stages, before being transmitted on line 40. As soon as 15 zeroes have been loaded in register 30, decode circuit 32 produces a bit 1 as input to AND circuit 34. A counter 36 connected on the output line 40 detects when a sequence of n consecutive 0 has been reached, and provide a 1 bit on the second input of AND circuit 34. Note that the reset of counter 36 (not shown) is either by the count of n zeroes or by the first 1 bit. Therefore, AND circuit 34 provides a 1 bit as output when a sequence of n+15 zero bits has been received on line 28. This 1 bit causes the bit pattern 010111111-111010 contained in register 38 to be loaded in shift register 30 instead of the 0 bits contained therein. Assuming that number N of zeroes of the DAS be equal to 90, number n+14 must be less than 90 so as not to be confused with the DAS. For instance, n can be chosen equal to 75.

As mentioned above, the device of FIG. 2 can be used in combination with the device shown on FIG. 1. In this case, the bit stream received on line 28 is already a modified bit stream wherein each 5th bit following four 0 bits has been inverted in the device of FIG. 1 represented in dashed lines on FIG. 2). If the data transmission is made in the BSC protocol, the number of consecutive 0 accumulated by counter 36 will be less than 70 as already explained.

Counter 36 will be reset by the first 1 bit before reaching the count n=7 causing the particular sequence to be never loaded in shift register 30. But, if the data transmission is in the HDLC protocol, it is possible that a bit stream composed of a long sequence of 0 bits be received on line 28, such a sequence being a source data stream of repetitive sequences 00001 which has been transcoded by the device of FIG. 1. When both 75 "zeroes" have been counted by counter 46 and decode circuit 32 has decoded a following sequence of fifteen 0 bits, the particular sequence 0101111111110 is loaded in shift register 30 in place of the sequence of 15 "zeroes". Thus, the device of FIG. 2 incorporating the device of FIG. 1, is able to process the data transmission using either BSC or HDLC protocol.

Figure 3:
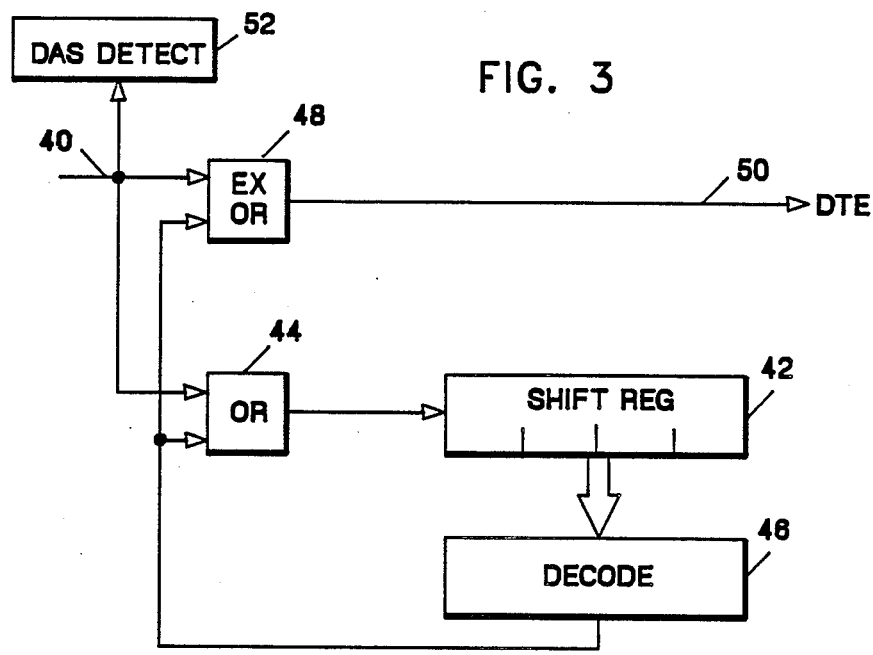
FIG. 3 is a block diagram of a device according to the invention on the reception side of a data transmission system using the BSC protocol.

A receiver implementing the invention in the example of the BSC protocol is shown on FIG. 3. The data stream received on line 40, is loaded in shift register 42, via OR circuit 44. As soon as four 0 bits are loaded in register 42, decode circuit 46 provides a 1 bit which is used as input to OR circuit 44 and to XOR circuit 48. Accordingly, a 1 bit is loaded after the sequence of four 0 bits in shift register 42, which prevents an eventual 5th zero bit from being taken into consideration by decode circuit 46. The 1 bit input to XOR circuit 48 is used to invert the bit which follows the sequence of four 0 bits. Therefore, the data stream which is transmitted to the DTE on line 50, is now the data stream received on line 10 of FIG. 1, before each 5th bit is inverted.

Note that the alarm signal DAS is detected by circuit 52 if the data stream received on line 40 is composed of N zero bits (N being 90 in the present example). In this case, the bit stream sent on line 50 is, of course, not taken into consideration as data. It must be noted that the device of FIG. 3 is the same as the one of FIG. 1, since the process of inverting a n+1th bit after a sequence of n zero bits is the same, either at transmission or at reception.

Figure 4:
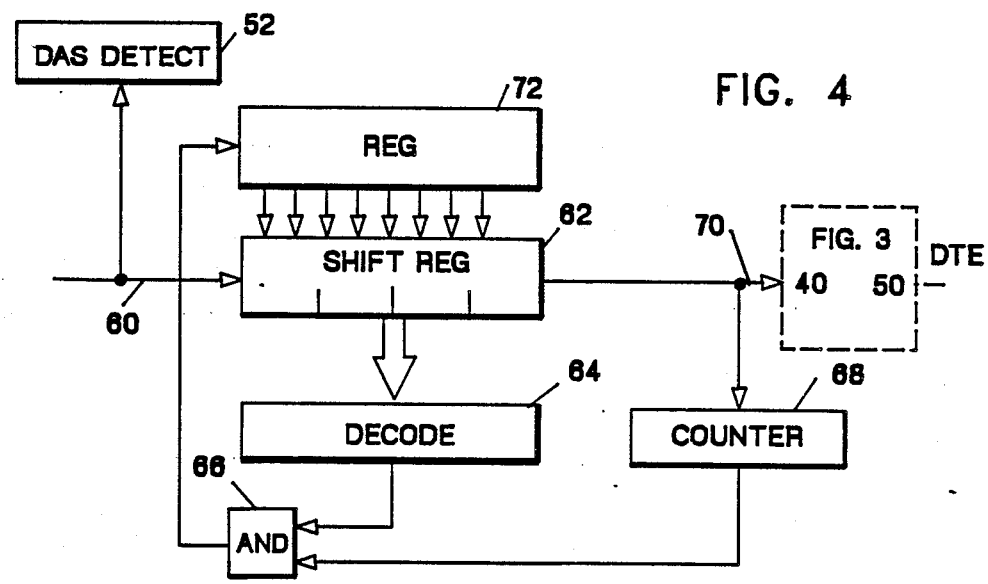
FIG. 4 is a block diagram of a device according to the invention on the reception side of a data transmission system using the SDLC protocol.

FIG. 4 shows the device which can be used in the receiver when the data transmission utilizes the HDLC protocol. The data bits received from line 60 are first loaded in shift register 62 composed of 15 stages. As soon as the particular sequence 010111111111010 is loaded in register 62, decode circuit 64 produces a bit 1 as input to AND circuit 66. Counter 68, connected to the output 70 of register 62, detects when a sequence of n (e.g. n=75) consecutive 0 bits is present on line 70, and provides a 1 bit to the second input of AND circuit 66. Therefore, AND circuit 66 produces a bit 1 when a sequence composed of n zero bits followed by the above particular sequence, has been received on line 60, such a bit causing a pattern of 15 zero bits contained in register 72 to be loaded into shift register 62 in place of sequence 010111111111010. It must be noted that, contrary to the device used in case of BSC protocol, the reception device used in HDLC is the reciprocal of the transmission device, and not identical.

The device for the HDLC protocol shown on FIG. 4 can be used alone or in combination with the device for the BSC protocol of FIG. 3. In the former case, the data stream on line 70 is sent directly to the DTE. In the latter case, the data stream is first processed as explained above if the transmission is made in HDLC. If not, the data stream is only processed by the device used for the BSC protocol of FIG. 3 (represented by dashed lines on FIG. 4). Note that, such a combination able to process both BSC and HDLC protocols at the reception side, can be used only if the corresponding combination (see FIG. 2) is used at the transmission side.

The invention has been described in connection with the BSC or HDLC protocols because these protocols are widely used in present day data transmission systems. Thus, a device incorporating the combination able to process the BSC protocol as well as the HDLC protocol such as shown on FIG. 2 for the transmission, and on FIG. 4 for the reception, could be used in more than 90% of the data transmission systems. However, the invention is not limited only to BSC and HDLC protocols, but can be adapted to suit other protocols insofar as particular sequences of bits are impossible with these protocols and therefore can be used to transcode the long sequences of 0 bits which would otherwise be confusable with the DAS.

Though the invention has been described in the environment of a digital communication network such as the US Dataphone Digital Service (DDS), it could be implemented with an analog communication network, the difference being that the data bit stream is modulated before being transmitted over the analog communication network and demodulated when received. Likewise, the DAS signal could be composed of 1 bits rather than the 0 bits which must be used in DDS. It will be understood by the man skilled in the art that such changes and others not mentioned here, may be made without departing from the spirit and scope of the invention.

We claim:

1. Data transmission system comprising a data transmitter transmitting information signals over a data network to a data receiver, said information signals being either data bits when said transmitter is in data mode, or a sequence of N alarm bits in a first binary state when said transmitter is in alarm mode; said data transmitter comprising: alarm transmission means (22) for transmitting said sequence of N alarm bits over said data network instead of the same number of data bits which would have been transmitted, as soon as said system switches to said alarm mode;

a detection device (16 or 36) providing a detection signal each time that, in a source (36) data bit stream transmitted by said transmitter in said data mode, a sequence of n bits in said first binary state has been detected, and a bit modifying means (18 or 38) for inverting the binary state of at least one bit of said source data bit stream following said sequence of n bits in response to said detection signal without modifying the number of bits in said source data bit stream, thereby providing a modified data stream, of the same length as said source data bit stream, said number n being chosen so that no modified data bit stream can be formed of N bits in said first binary state which could be confused with said sequence of N alarm bits.

2. Data transmission system according to claim 1 wherein said data transmitter sends information signals in the BSC protocol in which a source data bit stream of a length greater than 70 and composed of juxtaposed sequences "00001" is impossible, N is chosen greater than 70, and said detection device (16) provides a detection signal each time that a sequence of 4 zero bits has been detected in the source data bit stream, and said bit modifying means (18) inverts the binary state of the bit following said sequence of 4 zero bits so that a source data bit stream composed of juxtaposed sequences 00001 cannot result in a modified data bit stream formed of N zero bits 3. Data transmission system according to claim 2 wherein said detection device (16) is a decode circuit providing a 1b 1 bit when a sequence of 4 zero bits from the source data bit stream has been loaded in a shift register (14), and said bit modifying means (18) is a XOR circuit inverting the data bit of the source data bit stream when receiving the 1 bit from said decode circuit.

4. Data transmission system according to claim 2 or 3 wherein N>84 and said data transmitter further transmits information signals in the HDLC protocol and includes HDLC transcoding means connected at the output of said bit modifying means (20) and comprising:

a counter (36) for counting the number of 0 bits of a sequence of consecutive 0 bits in the data bit stream and providing an 1 bit signal when this number is at least equal to 70 but less than N−14, a decode circuit (32) providing a 1 bit signal when the 15 bits following said sequence of 0 bits in the data stream are all 0 bits, and an AND circuit (34) providing a modifying bit in response to both signals provided by said counter and said decode circuit, said modifying bit causing a predetermined bit pattern to replace said 15 zero bits in the data stream, thereby providing a modified data stream which cannot be confused with said sequence of N alarm bits.

5. Data transmission system comprising a data receiver receiving information signals over a data network from a data transmitter of a data transmission system according to claim 1, said information signals being either data bits when said transmitter is in data mode, or a sequence of N alarm bits in a first binary state when said transmitter is in alarm mode; said receiver being characterized in that it comprises:

a detection device (46 or 68) providing a detection signal each time that, in a data bit stream received by said receiver, a sequence of n bits in said first binary state has been detected, and a bit means (48 or 72) for inverting the binary state of at least one bit of said received data bit stream following said sequence of n bits in response to said detection signal, without modifying the number of bits in said received data bit stream, thereby providing a modified data bit stream, of the same length as said received data bit stream, said number n being identical to the number n of said transmitter so that no modified data bit stream can be formed of N bits in said first binary state which could be confused with said sequence of N alarm bits received from said transmitter in said alarm code.

6. Data transmission system according to claim 5 wherein said data receiver receives information signals in the BSC protocol in which a data bit stream of a length greater than 70 and composed of juxtaposed sequences "00001" is impossible, N is chosen greater than 70, and said detection device (46) provides a detection signal each time that a sequence of 4 zero bits has been detected in the received data bit stream, said bit modifying means (48) inverts the binary state of the bit following said sequence of 4 zero bits.

7. Data transmission system according to claim 6 wherein said detection devices (46) is a decode circuit providing a 1 bit when a sequence of 4 zero bits in the received data bit stream has been loaded in a shift register (42), and said bit modifying means (48) is a XOR circuit inverting the data bit of said received data bit stream when receiving the 1 bit from said decode circuit.

8. Data transmission system according to claim 6 or 7 wherein N>84 and information signals are received from a data transmitter of a data transmission system according to claim 4, and including HDLC transcoding means connected at the input of said bit modifying means (40) comprising:

a counter (68) for counting the number of 0 bits of a sequence of consecutive 0 bits in the received data bit stream, and providing a 1 bit signal when this number is at least equal to 70 but less than N-14, a decode circuit (64) providing an 1 bit signal when the 15 bits following said sequence of 0bits in said received data bit stream, is a predetermined bit pattern, and an AND circuit (66) providing a modifying bit in response to both signals provided by said counter and said decode circuit, said modifying bit causing a sequence of 15 zero bits to replace said predetermined bit pattern.

9. Data transmission system according to any one of the preceding claims 1-7 for transmitting or receiving information signals over a digital communication network of the type Dataphone Digital Service (DDS).

* * * * *